United States Patent [19]
Wythe et al.

[11] 3,849,101
[45] Nov. 19, 1974

[54] COOLING SYSTEM FOR GLASS FORMING MOLD

[75] Inventors: Frederick Joseph Wythe, Hebron; George Dudley Mylchreest, Simsbury, both of Conn.

[73] Assignee: Emhart Corporation, Bloomfield, Conn.

[22] Filed: Nov. 6, 1972

[21] Appl. No.: 304,207

[52] U.S. Cl............... 65/355, 65/162, 65/265, 65/356, 165/180
[51] Int. Cl............................................ C03b 9/38
[58] Field of Search ............ 65/162, 265, 319, 351, 65/354, 355, 356; 165/180

[56] References Cited
UNITED STATES PATENTS

| | | | |
|---|---|---|---|
| 2,448,315 | 8/1948 | Kunzog | 165/154 |
| 2,751,715 | 6/1956 | Denman | 65/356 |
| 2,893,703 | 7/1959 | Richardson | 165/47 |
| 3,061,940 | 12/1962 | Cichelli | 165/120 |
| 3,171,731 | 3/1965 | Barger et al. | 65/162 |
| 3,364,951 | 1/1968 | Burne et al. | 165/180 |
| 3,478,574 | 11/1969 | Modell | 65/162 |

*Primary Examiner*—S. Leon Bashore
*Assistant Examiner*—Richard Pace
*Attorney, Agent, or Firm*—McCormick, Paulding & Huber

[57] ABSTRACT

A mold cavity defining structure includes inner wall means defining a glassware forming surface which is adapted to contact the molten glass and to thereby remove heat from the molten glass. This inner wall means also defines a second surface, spaced outwardly from the first, and which can be cooled so that heat is adapted to be conducted outwardly from the first surface toward the second surface. The mold cavity defining structure further includes outer wall means spaced from the inner wall means and defining a third surface which is spaced outwardly from the second surface of the inner wall means to define an internal chamber of generally annular shape therebetween. This chamber is filled with a porous metal filler material, comprising generally spherical particles which are brazed or sintered to one another and also to the second surface of the inner wall means, but which brazed particles also define interstices therebetween to achieve a high degree of porosity in the filler material. Means is provided for passing a coolant such as air through the porous metal filler material, and preferably said coolant is caused to pass through the chamber in a radial direction, from adjacent the outer boundary of the filler material, to the inner boundary thereof. The filler material preferably comprises generally spherical Monel beads having a diameter of approximately 3/32nds of an inch, giving the brazed filler material a density of approximately 65% that of the bead material.

11 Claims, 7 Drawing Figures

AIR INLET

A

B

C

COOLING SYSTEM FOR GLASS FORMING MOLD

BACKGROUND OF THE INVENTION

In the glassware manufacturing industry there is a continuing requirement that new equipment be provided capable of increasing the rate of manufacture of glassware, while maintaining or improving the quality of the product itself. It will of course be apparent that the output capacity of a glass container manufacturing operation is necessarily limited to the rate of production of the slowest element or link in the chain of machines for producing the ware. One limiting factor in the output of a typical facility has been the low rate of heat dissipation from the molds themselves. Cooling of these molds has in the past been accomplished by directing air at the exterior of these molds, and more refined efforts have included the provision of passageways in the molds themselves as is taught for example in Pat. No. 3,499,746, issued to Blankenship in 1970.

Another Pat. No. 2,751,715, issued to Denman in 1956, shows an air cooled mold which defines an internal chamber, into which chamber cooling fluid is introduced from below the mold and exhausted at the upper end of said mold. However, in both Denman and in the Blankenship et al. patent the amount of heat transferred between the mold to be cooled and the cooling fluid is necessarily limited by virtue of the surface area of the mold in contact with the cooling fluid.

Attempts to increase the effective area of the mold to be cooled in this area have usually taken the form of providing fins or spikes on the mold as taught, for example, in U.S. Pats. No. 3,224,860, issued in 1965 to Stinnes, and No. 3,404,974, issued in 1968 to Belentepe et al. It has been found, however, that this approach to increasing the area of the interface between the mold and the cooling fluid has several disadvantages, not the least of which is a result of the mechanical design problems inherent in this approach, and of course the economic penalties to be paid by one who uses this prior art method commercially.

A primary object of the present invention is to overcome the above-mentioned disadvantages of prior art mold cooling designs and to provide an improved mold cooling system wherein the effective area between the metal mold and the cooling fluid is effectively increased without the disadvantages referred to in the complex mold designs characteristic of the foregoing paragraph.

The foregoing object is accomplished by providing an internal chamber in the mold defining structure, and by filling this chamber with metal particles which are brazed or sintered to one another and to the walls of the chamber by a brazing process which does not render the filler material solid, but instead leaves voids or interstices between these particles to permit a coolant fluid to be circulated through the chamber in a novel manner to be described herein. As a result of this method of fabricating a mold structure, the effective area of the mold-coolant interface is greatly increased without sacrifice to complexity in the design of the mold.

Pat. No. 3,171,731, issued to Barger et al. in 1965 shows a plunger for use in a mold of the type used in glassware forming machines, which plunger is cooled by circulating a coolant through a filler material provided for this purpose in the plunger. However, in the Barger disclosure the filler material does not comprise an integral portion of the relatively thin walled plunger, and although the filler material does commprise discrete particles which are packed in place to promote heat transfer characteristic therebetween these particles are not brazed or sintered together to achieve the necessary heat transfer characteristics, nor are they bonded to the wall of the plunger in order to provide a structure equivalent to that disclosed and claimed herein.

SUMMARY OF THE INVENTION

In accordance with the presently preferred form of our invention a mold cavity defining structure is provided and includes inner wall means defining the glassware forming surface, which surface is adapted to contact the molten glass, and to remove heat therefrom. This inner wall means further defines a second surface, spaced radially outwardly from the first so that heat is adapted to be conducted outwardly from said first surface and through said second surface as a result of structure integrally connected thereto. Outer wall means is provided in outwardly spaced relationship to the inner wall means and defines a third surface spaced from said second surface to thereby define an internal annular chamber therebetween. This chamber is filled with a porous metal filler material which comprises generally spherical metal particles which have been sintered to one another by brazing, or other similar process, to improve heat conduction among themselves, and to define interstices therebetween, which interstices will provide paths for a cooling fluid, such as air, to further improve the heat transfer characteristics of our composite mold defining structure.

DETAILED DESCRIPTION

Figure 1:
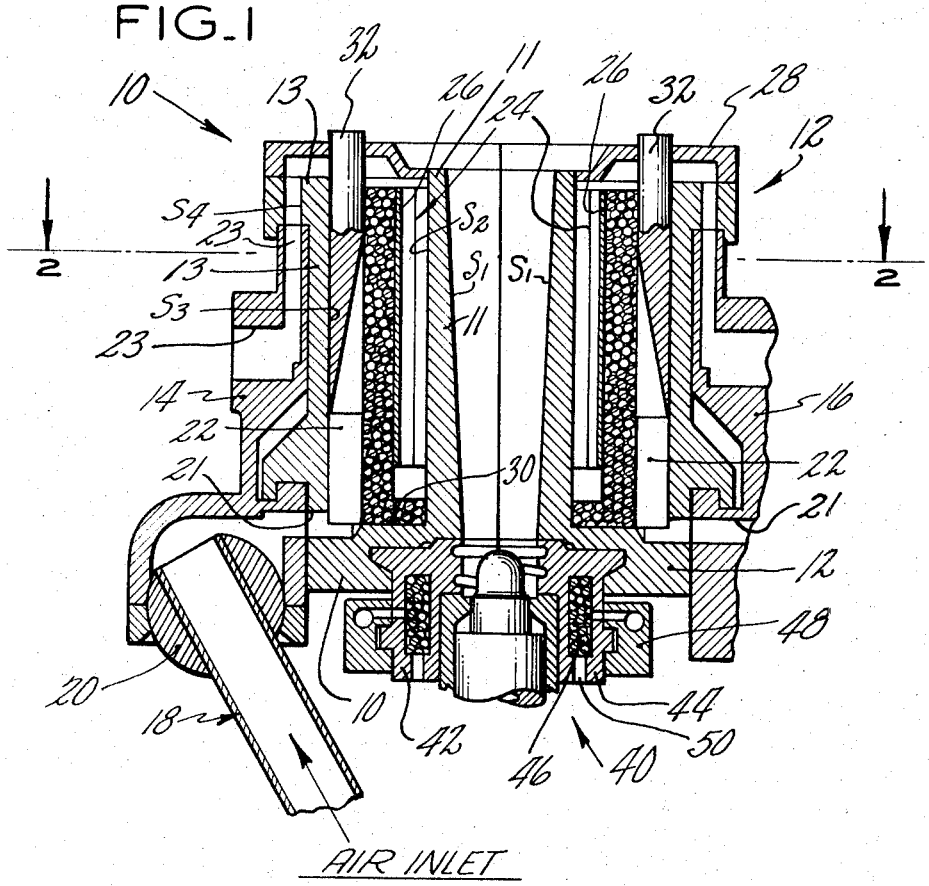
FIG. 1 shows in vertical cross section a split blank mold equipped with a porous metal filler and associated structure in accordance with the present invention, and also shows a neck ring mold associated therewith.
Figure 2:
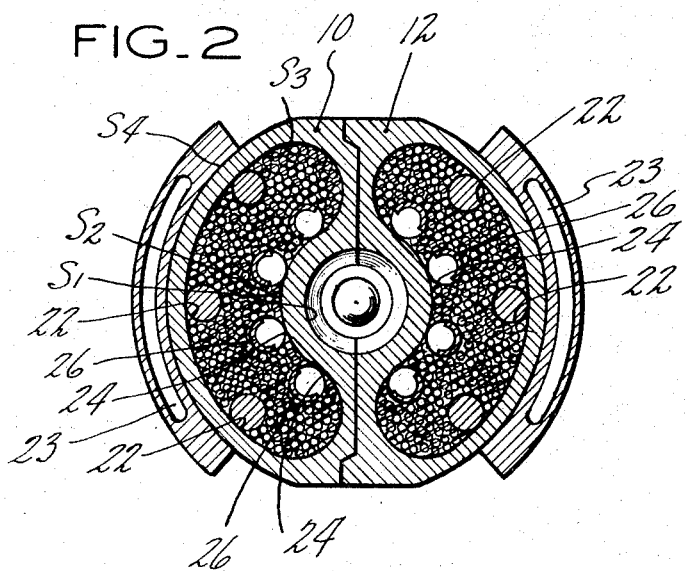
FIG. 2 is a horizontal sectional view taken on the line 2—2 of FIG. 1.
Figure 3:
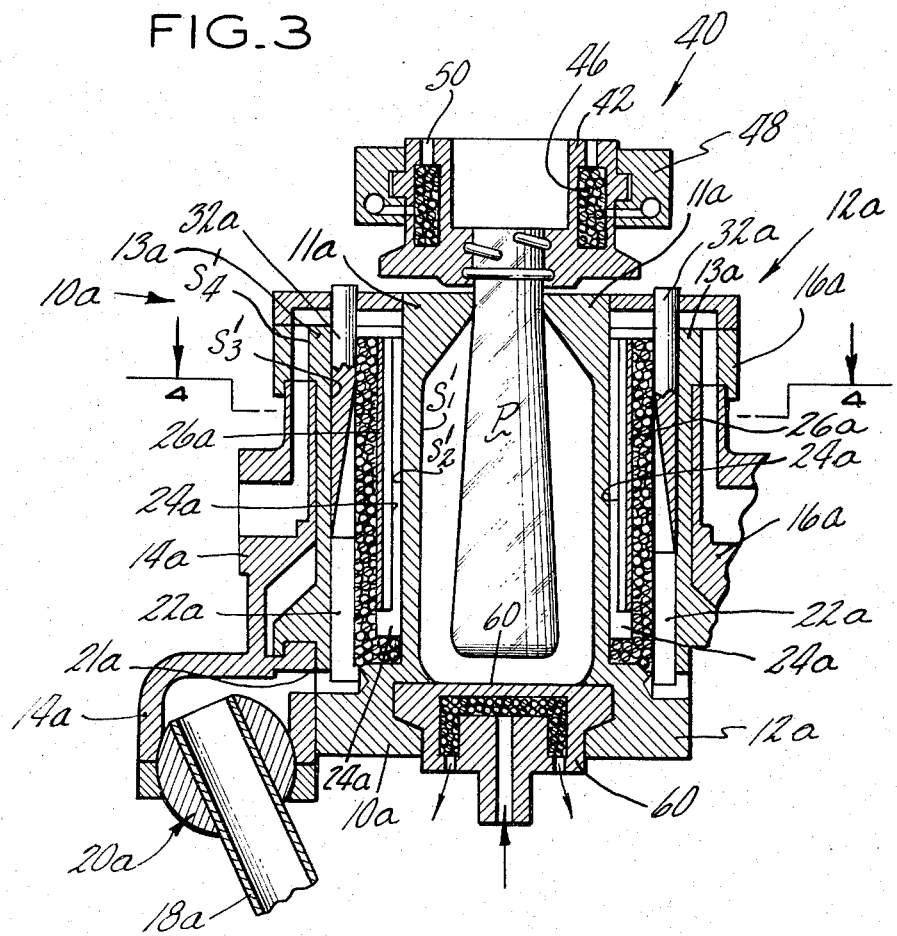
FIG. 3 is a vertical sectional view of a split blow mold incorporating the present invention, and also shows the neck ring mold of FIG. 1 as well as a bottom plate equipped with a cooling system in accordance with the present invention.
Figure 4:
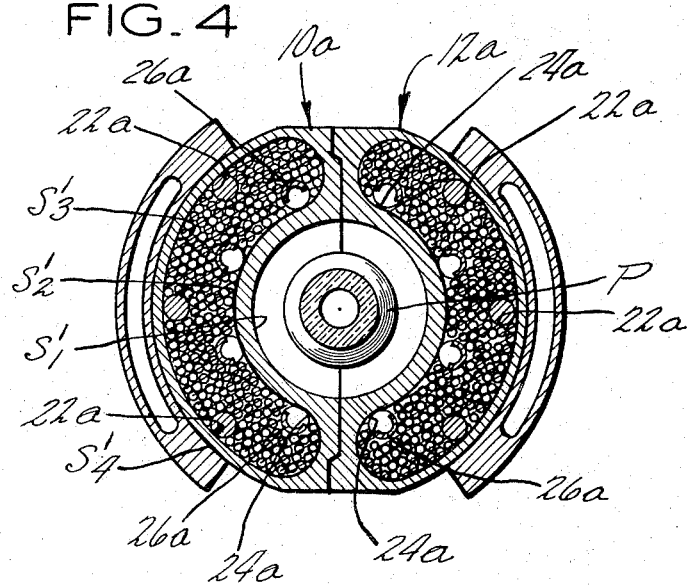
FIG. 4 is a horizontal sectional view taken on the line 4—4 of FIG. 3.

Turning now to the drawings in greater detail, split blank and blow molds are shown respectively in FIGS. 1 and 3, both views showing in cross section, and FIGS. 2 and 4 in plan view respectively, the basic elements for incorporating the present invention in a typical glassware forming machine mold. Referring now more particularly to the split blank mold construction shown in FIGS. 1 and 2, a mold defining structure is indicated generally at 10 and 12, which structure is preferably fabricated from cast iron or the like and will differ from a conventional cast iron split blank mold in that each of the mold defining structures 10 and 12 includes an internal chamber which may be open at the upper end of this mold structure for convenience in the manufacture thereof.

The split mold defining structures 10 and 12 may be conventionally mounted on mold holder arms 14 and 16 respectively, which arms may be themselves conventionally mounted on a single hinge pin (not shown) as is done in the conventional Hartford I.S. machine. As so arranged means is provided for conveying a coolant fluid, preferably air, to the above mentioned chambers and said means preferably comprises passageways in the mold holder arms, and a cooling tube 18 which is connected to the mold holder arm by a ball and socket connection as indicated generally at 20. As so constructed and arranged cooling air can be conveyed to the mold holder arm and hence to the chamber defined for this purpose in the split blank mold shown in FIG. 1 and to the mold structure 12 in a similar manner. The mold holder arm 14 defines an inlet passageway 21 and an outlet passageway 23 for delivering and receiving coolant fluid to and from the mold defining structure 10. Similar passageways are provided in the mold holder arm 16 for the mold 12, and a flexible inlet tube and swivel arrangement (not shown) are also provided. A top or cover plate 28 for each mold is also included and serves to define a portion of the coolant outlet passageway means for the mold defining structures 10 and 12.

Considering the make-up of the mold defining structures 10 and 12 in greater detail, FIG. 1 also shows that each of these structures includes an inner wall means 11 as well as an outer wall means 13 located in spaced relationship to one another and defining an internal semi-annular chamber therebetween. The inner wall means 11 defines the glassware forming surface $S_1$, hereinafter referred to as the first surface, which first surface is adapted to contact the molten glass and to thereby remove heat from the molten glass. Said inner wall means 11 also defines a second surface $S_2$ spaced outwardly from the first surface $S_1$ and it is a feature of the present invention that this heat is adapted to be conducted outwardly from said first surface to said second surface.

The outer wall means 13 is located in spaced relationship to the inner wall means 11, as described above, and defines an inner or third surface $S_3$ which is spaced outwardly from said second surface $S_1$ and which cooperates therewith to define the internal annular chamber of the mold defining structure as mentioned above. The outer surface of the outer wall means $S_4$ may be of conventional appearance for a split blank mold of the type for use in the mold holder arm of a Hartford I.S. type of machine in that said surface $S_4$ includes suitable attachment means for permitting the mold structure of the present invention to be carried on a mold holder arm of the type including air coolant passageways.

The internal annular chamber defined between the second and third surfaces, $S_2$ and $S_3$ respectively, preferably contains a porous metal filler material. This porous metal filler material is preferably fabricated from generally spherical Monel particles which have a width or diameter in the range 3/64 to 3/16 of an inch, and the presently preferred bead size is 3/32 of an inch. This bead size, when brazed, creates an ideal combination between the requirement of being able to pass a coolant fluid, such as air, through the filler material, with a reasonable pressure drop, and the design objective to which the beads contribute so much, namely the increase in surface area between the air and the beads themselves. It will be apparent that, as the size of the beads is increased so too is the size of the interstices therebetween, thus decreasing the pressure drop across a given volume of the brazed head filler material. On the other hand, it will also be apparent that there is a finite limit to the size of the beads, dictated at least in part by the permitted size of the chamber for the material mold structure. More significantly, however, and perhaps somewhat less obvious, is the necessity for keeping the beads of as small a size as possible in order to maximize the surface area of a given volume of these beads. As will be demonstrated hereinbelow, this parameter of surface area per unit volume is inversely related to the size of the beads used. We have found that the foregoing requirements can be best balanced by adopting a bead size in the range 3/64 to 3/16 of an inch. With the brazing method used in fabricating the mold structures of FIGS. 1 and 3, we have found the preferred size for these brazed beads to be 3/32nd of an inch.

Although the Monel beads are preferred, other heat conductive metals and shapes might be used to realize the advantages of the present invention. For example, the beads need only to be rounded enough to permit them to be brazed in the manner to be described, and to still define the necessary porosity for passing the requisite quantity of coolant fluid. The term generally spherical will be used to describe these properties. Stainless steel or other heat conductive metal might be used and will be considered the equivalent of the Monel balls described herein.

The presently preferred method of brazing or sintering these particles one to another comprises the use of a brazing alloy such as NICROBRAZE 50 suspended preferably in 300 NICROBRAZE CEMENT manufactured and sold by Wallcolmonoy. In accordance with the presently preferred method of fabricating a mold in accordance with the present invention, these particles are coated with this mixture and the resulting material poured into the annular cavity defined in the split blank mold structure shown in FIG. 1. The resulting assembly is placed in a brazing furnace at approximately 1,800° to 1,900° F., that is, below the melting point of cast iron, under a vacuum or a dry hydrogen atmosphere. It has been found that the above method for constructing a mold in accordance with the present invention results in the desired porosity in the porous metal filler, and also results in a very desirable heat conduction characteristic for the resulting mold structure. Not only do the particles bond to one another, and hence conduct heat therebetween, but they adhere to the inner wall means 11 of the mold structure to conduct heat directly from the surface $S_2$, thereby promoting the heat transfer from surface $S_1$ through $S_2$ as mentioned above.

Turning now to a description of the means defining fluid inlet and outlet opening for directing the flow of coolant fluid through the porous metal material provided in the annular chamber of the mold shown in FIG. 1, it is noted that internal inlet passageways 22, 22 are defined in communication with the passageway 21 provided for this purpose in the mold holder arm, and that similar outlet passageways 24, 24 are also defined for assuring that the coolant fluid is so distributed as to intercept the heat flow from adjacent the outer surface $S_2$ of the inner wall means 11. Thus, the heat will pass generally radially outwardly toward the inner surface $S_3$ of the outer wall means 13 to achieve a most efficient cooling of the mold structure.

FIG. 2 shows in plan view the three generally vertically oriented cylindrical passageways 22, 22 as being provided adjacent the surface $S_3$ of the outer wall means 13 and communicating with the inlet passageways 21, 21 in the mold holder arm for directing the flow of cooling fluid to the outer boundary of porous metal filler material. These vertically oriented passageways 22, 22 are preferably formed when the mold is fabricated by inserting solid cores (not shown) at these locations when the mix of porous metal material is placed in the annular chamber. Each of these passageways 22, 22 also includes in its upper end a plug 32, which plug has an inner end so shaped and formed as to control the distribution of the cooling air as it flows radially inwardly toward the source of heat to achieve the end summarized in the preceding paragraph. In the embodiment shown in FIG. 1, for example, these plugs 32, 32 are of tapered configuration so as to distribute the air in the desired manner throughout the length of the cylindrical passageways 22, 22 with which they are associated.

The outlet openings for the coolant fluid defined in the porous metal filled annular chamber are preferably in the form of upwardly open cylindrical passageways defined by the bonded porous metal material in the same manner as described above with reference to the inlet passageways 22, 22. However, in the embodiment shown in FIG. 1, these outlet passageways 24, 24 extend downwardly to a point short of the lower boundary of the annular chamber, and are upwardly opened as opposed to the downwardly open passageways 22 mentioned above. Further, these outlet openings or passageways 24, 24 are fitted with shields 26, 26 which shields serve to direct the flow of cooling air through the porous metal material in the annular cavity so as to cause said air to enter these outlet passageways at a point adjacent the surfaces $S_2$ to be cooled as suggested in FIG. 2. Thus, the shields, 26, 26 are inserted after fabrication of the mold since the outlet passageways 24, 24 would preferably be formed at the time of fabrication of the mold by cores (not shown) in the same manner as described above with reference to the inlet passageways 22, 22. Each of these shields 26, 26 appears in horizontal section as a semi-annular segment or half-tube, as best shown in FIG. 2.

Still with reference to FIG. 1, a neck ring mold also of the split mold type is shown generally at 40, and this neck ring mold may be of conventional external shape, but includes an annular cavity or chamber filled with the same porous metal filler material as referred to above. Inlet and outlet passageways are defined in the neck ring mold, and in neck ring holder, for bringing coolant fluid to the neck ring for substantially the same purpose as described hereinabove with reference to the split blank mold of FIG. 1. More particularly, the neck ring structure is indicated generally at 42 and 44, and said mold defining members 42 and 44 have spaced surfaces corresponding to $S_1$, $S_2$, $S_3$ and $S_4$ as described above with reference to the split blank mold. The porous metal filler material is indicated generally at 46 and assumes an annular configuration much like that of the internal chamber defined in the split blank mold structure of FIG. 1. Cooling air is introduced through the mold holder arm 48 associated with the neck ring mold 42 and passes downwardly through the annular chamber defined in the neck ring mold and thence outwardly as indicated generally at 50. A thimble may also be provided in association with the neck ring mold as is conventional practice, and this thimble is adapted to receive a reciprocating plunger for the forming of the glass blank or parison in the split blank mold of FIG. 1.

Turning now to the mold structure of FIG. 3, a split blow mold is depicted therein, which blow mold is adapted to receive the parison P formed in the blank mold of FIG. 1 after said parison has been transferred to the blow mold by the neck ring mold described in the preceding paragraph. In a typical Hartford I.S. glassware forming machine the parison would be formed in an inverted configuration as depicted in FIG. 1, and said parison would be reverted by a neck ring mechanism (not shown) so as to provide the parison P in the location depicted for it in FIG. 3.

The mold defining structure of FIG. 3 is substantially similar to that of FIG. 1 except that the internal shape to which the bottle will be final formed differs from that of the blank mold of FIG. 1 in that the blow mold shape is somewhat larger. The mold defining structure of FIG. 3 is similar to that of FIG. 1, and includes mold holder arms 14a and 16a similar to the arms 14 and 16 of FIG. 1. Similar parts will be denoted by reference numerals to which the subscript a has been appended in the description to follow. Cooling air is provided through the tube 18a which is connected to the movable mold holder arm 14a by a ball and socket connection 20a in order to provide cooling air to the port or ports 21a in the mold holder arm communicating with the lower end of an annular chamber defined in the blow mold structure 10a. Inner and outer wall means, 11a and 13a respectively, are provided in the blow mold structure of FIG. 3 and define said annular chamber therebetween, which chamber is in turn provided with a porous metal filler material similar to that described hereinabove with reference to the blank mold of FIG. 1. Inlet and outlet passageways, 22a and 24a respectively, are provided in the porous metal filler material, and may be preformed in the manner described hereinabove with reference to the blank mold of FIG. 1. Similarly, suitable plugs 32a are provided in the upper end of the inlet passageways 22a for achieving the desired distribution of cooling fluid through the porous metal filler material. So too, half tubular elements 26a are provided in the outlet passageways 24a for directing the flow of air in the desired direction and adjacent to the surface $S_2'$ in order to improve the cooling characteristics of the preferred embodiment shown in FIG. 3. The neck ring mold shown at 40 in FIG. 3 is the same as that shown in FIG. 1 and need not be described in detail.

Still with reference to the blow mold station shown in FIG. 3, it is noted that the bottom plate, depicted therein at 60, is equipped with inlet and outlet passageways which are adapted to circulate cooling fluid to an internal chamber of generally annular configuration adapted to be filled with porous metal filler material in accordance with the present invention.

Figure 5:
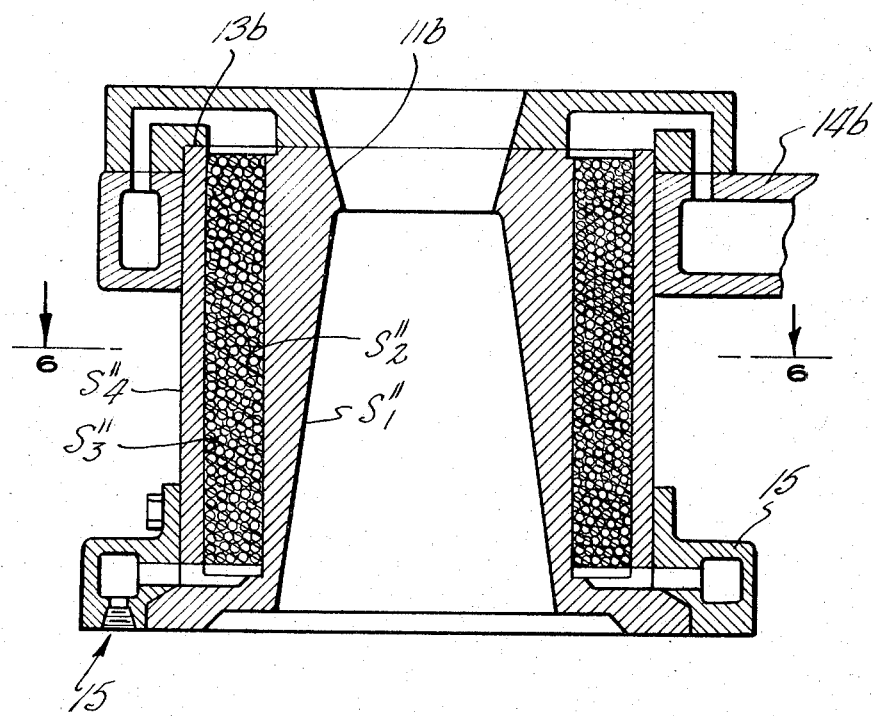
FIG. 5 is a view of a solid blank mold equipped with a porour metal filler in accordance with the present invention.
Figure 6:
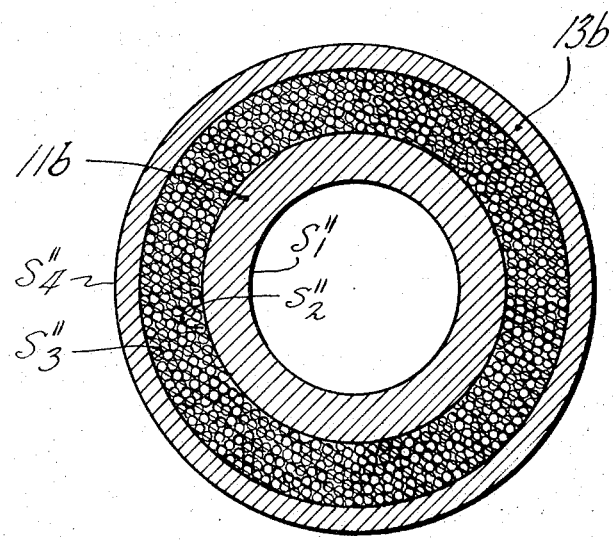
FIG. 6 is a horizontal sectional view taken on the line 6—6 of FIG. 5.

Turning next to a description of the solid blank mold construction of FIGS. 5 and 6, it will be apparent that the solid blank shown in FIG. 5 includes an internal surface $S_1''$ to be cooled, inner wall means as indicated generally at 11b, a second surface $S_2''$ spaced from the first and cooperating with a third surface $S_3''$ to define an internal annular cavity in the mold defining structure suitable for use as a heat sink when filled with porous metal material in the manner described hereinabove with reference to the split blank mold of FIG. 1. In the solid blank version shown in FIG. 5, air is introduced to the annular internal chamber through the hollow mold holder arm 14n and vented to the atmosphere at the lower end of the solid blank as indicated generally at 15. The solid blank mold structure of FIG. 5 is similar to the split blank mold defining structure of FIG. 1 in that the upper end of the mold structure is open to receive a gob of glass, being subsequently closed by suitable baffle means or the like, and the lower end of the solid blank mold is adapted to be fitted to a neck ring mold or other suitable glassware forming equipment so as to permit forming of the glass parison in the blank mold prior to reverting the parison or blank for final forming at a blow mold station.

In conclusion then the cooling system of the present invention can be adapted to use on a variety of mold components of the type used in present day glassware forming machines. The rapid removal of heat has become a necessary design criterion, especially at the blow mold station of a typical Hartford I. S. machine, and it is an important feature of the present invention that the removal of heat is facilitated by the provision of an internal chamber in the mold defining structure, which chamber is filled, or nearly so, with a porous metal filler consisting of Monel or stainless steel beads which have been brazed together to provide the requisite heat transfer characteristics, and yet retain the necessary porosity to permit the free flow of coolant fluid therethrough.

Experimentally, we have found that a filler made from Monel beads of approximately 3/32 of an inch diameter, and brazed as described above, yields the optimum balance between; the need for increasing the surface area between the brazed beads and the coolant fluid to achieve the heat transfer advantages of our invention; and the need for defining interstices between these brazed beads which will be of sufficient size to permit the use of fluid at a relatively low pressure, such as low pressure air.

The advantages to providing a filler material in an annular mold cavity for improving the heat transfer characteristics of the mold can be demonstrated by the following observations.

Theoretically, it can be shown that with perfectly packed spheres the density of a 1 inch cube will be 74% that of the solid bead material. Assuming that our spheres are not packed quite so tightly, and allowing for some tendency of the brazing alloy to fill our interstices to some slight extent, we can postulate a density for our filler material of approximately 65% that of the solid bead material. Therefore, we can calculate the number of 3/32 of an inch diameter beads per unit volume as follows:

the Volume of beads per cubic inch = 0.65 cubic inches;

the Volume of a single bead = $\pi (3/32/6)^3$ cubic inches;

consequently, the number of beads per cubic inch =

$$\frac{0.65}{\frac{\pi \left(\frac{3}{32}\right)^3}{6}} = N$$

the area of a single bead = $\pi (3/32)^2 = A$ and the area of all beads in one inch cube can be simply $N \times A$:

$$\frac{0.65}{\frac{\pi \left(\frac{3}{32}\right)^3}{6}} \times \pi \left(\frac{3}{32}\right)^2 = \frac{3.9}{\left(\frac{3}{32}\right)}$$

= 41.6 square inches

By way of comparison a solid cube 1 inch on each side will have a total area of 6 square inches. Still by way of comparison, a usual mold might be 5 inches tall and 18 inches circumference to show 90 square inches of heat transfer surface to the cooling air. A mold made with the porous filling would have about 50 cubic inches of porous metal which at 41.6 square inches per cubic inch gives 2080 square inches, or 230 times as much heat transfer area. These calculations also show that the area of the beads per unit volume is inversely proportional to the diameter of the beads used.

The foregoing calculations also show that the heat transfer advantages to fabricating a mold according to the present invention represent a significant advance in the mold art. One could not achieve the large surface area exposed to the coolant fluid, which is possible with our invention, with prior art approaches utilizing internal mold passageways, chambers, and even with the more complex designs employing fins and spikes. As mentioned in the Background of our Invention above, these prior art approaches can only lead to very expensive mold structures, which will nevertheless be inferior to our mold structure.

Figure 7:
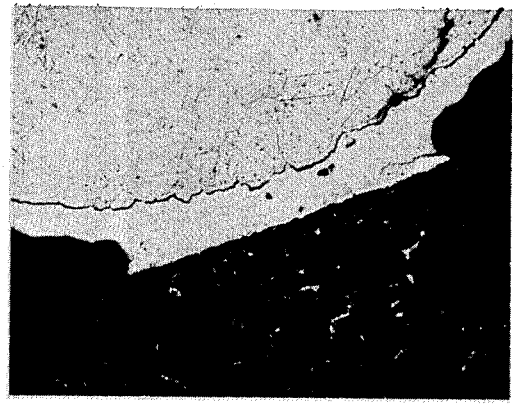
FIG. 7 is a photomicrograph of a cross section of the FIG. 1 mold.
Figure 7:
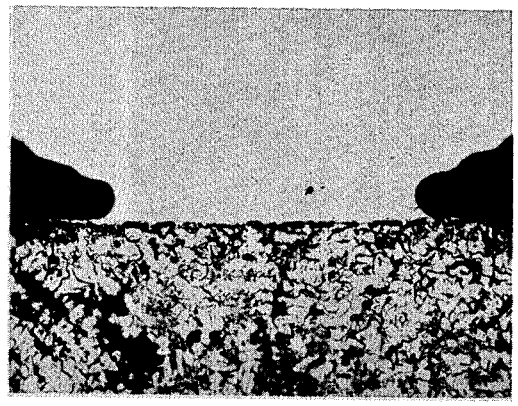
Figure 7:
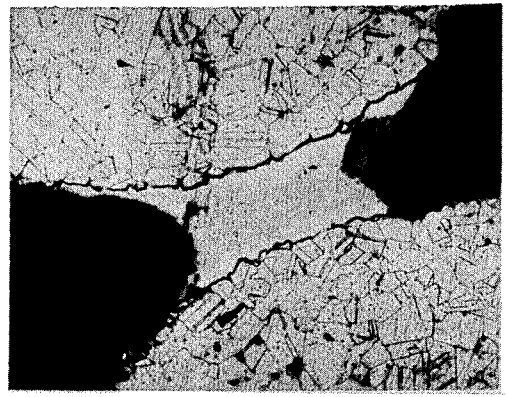

FIG. 7 shows three photomicrographs A, B and C of our preferred porous metal filler material in cross section. More particularly, the top and bottom views A and C show quite graphically the interaction between brazing alloy and Monel bead metal at the junction between beads and against the cast iron. The jagged dark line representing the outline of the beads was, of course, smooth and spherical prior to the brazing process. After brazing, however, the Monel bead metal migrates into the brazing alloy as shown by the jagged dark interface line.

The two top views, A and B of FIG. 7 show the same area of the mold structure but in the top view A the sample was etched by the same process as used in developing the ball-to-ball view C. This etchant in the top view A did not reveal the cast iron mold metal very clearly. Therefore, the view B was etched with a different etchant to show the interface between the cast iron and the brazing alloy. Although this dark interface line is not as jagged as that of FIG. 7C, it does show that some migration has occurred between the cast iron mold metal and the brazing alloy.

In conclusion then, the mold structure described and claimed herein provides the necessary heat transfer characteristics to satisfy the design requirements of the next generation glassware forming machines, and does so without the complex design features characteristic of prior art approaches.

We claim:

1. In a glassware forming machine the improvement comprising:
   a. a cast iron mold cavity defining structure including inner wall means defining a glassware forming first surface which is adapted to contact the molten glass material and to remove heat therefrom, and said inner wall means defining a second cast iron surface spaced from the first so that heat is adapted to be conducted from said first surface generally toward said second surface;
   b. outer wall means spaced from said inner wall means and defining a third surface spaced from said second surface, and an internal chamber between said second and third surfaces;
   c. a porous metal filler material in said chamber and comprising generally spherical metallic particles which have been brazed to one another for improved heat conduction between the particles, and defining interstices between adjacent particles for preserving the porosity of said filler,
   d. said metallic particles being brazed to said second cast iron surface by the same metallic brazing alloy used to braze said particles to one another so as to not only improve the heat conduction between the particles, but also between the particles and said cast iron inner wall means;
   e. and means defining a fluid inlet and an outlet opening for passing a coolant fluid through said interstices in said porous metal filler material to cool the particles and in turn to cool the inner wall means which defines said glassware forming first surface.

2. The combination recited in claim 1 wherein said mold cavity defining structure comprises a split mold, and wherein said internal chamber comprises several individual chambers associated with each of said split molds.

3. The combination recited in claim 1 wherein said mold cavity defining structure comprises a one piece body mold having an upwardly open annular chamber surrounding the mold cavity and defining said internal chamber.

4. The combination recited in claim 1 wherein said fluid inlet means comprises means defining fluid inlet passageways defined at least in part by said porous metal filler material adjacent said third surface of said outer wall means and in said internal chamber.

5. The combination recited in claim 1 wherein said fluid outlet means comrises means defining fluid outlet passageways defined at least in part by said porous metal filler material adjacent said second surface in said inner wall means and in said internal chamber.

6. The combination recited in claim 4 wherein said mold cavity has an axis of symmetry extending the length of said structure, and said means defining said fluid inlet passageways extend the axial length of said third surface, which surface is generally cylindrical and oriented in radially outwardly spaced relation to said second surface, and plugs for the ends of said axially extending inlet passageways, said plugs having lower ends so shaped as to direct cooling fluid in a predetermined pattern generally radially inwardly across said porous metal filled chamber, said chamber being generally annular in shape and surrounding the mold cavity.

7. The combination recited in claim 6 wherein said fluid outlet means comprises means defining fluid outlet passageways extending generally axially adjacent said second surface of said inner wall means, said outlet passageways also defined at least in part by said porous metal filler material in said internal chamber.

8. The combination recited in claim 1 wherein said porous metal filler material comprises stainless steel particles which have been sintered in place with a brazing compound which not only serves to fuse the particles to one another but which also serves to join the particles to said second surface of said inner wall means.

9. The combination recited in claim 1 wherein said spherical particles have a diameter in the range between 3/64 and 3/16 of an inch.

10. The combination recited in claim 1 wherein said particles have a diameter of approximately 3/32 of an inch.

11. A mold structure for the formation of glassware articles comprising inner wall means defining article forming first surface adapted to contact the molten glass and to remove heat therefrom, said inner wall means defining a second surface spaced from the first, outer wall means spaced from said inner wall means and defining a third surface spaced from the second with an internal chamber therebetween, a porous metal filler material comprising generally spherical particles bonded to one another for improved heat conduction, and defining interstices between adjacent particles, and a metallic brazing alloy for brazing said particles to one another and to said inner wall means, said porous metal filler material adjacent said second surface defining generally cylindrical passageways oriented generally tangentially with respect to said second surface, said mold cavity having an axis of symmetry extending lengthwise of said structure, and means defining fluid inlet passageways extending axially the length of said third surface, which inlet passageways are also generally cylindrical and oriented tangentially with respect to said third surface, and plugs for the ends of said axially extending inlet passageways, said plugs having end portions so shaped as to direct cooling fluid in a generally radially oriented pattern across said porous metal filled chamber, said chamber being generally annular in shape and surrounding the mold cavity, and said generally cylindrical outlet passageways including arcuately shaped shield means associated therewith oriented opposite said point of tangency between said outlet passageways and said second surface whereby to direct the flow of coolant fluid around said shields and into said outlet passageways in closed spaced relationship to said second surface.

* * * * *